United States Patent [19]

Heller et al.

[11] 4,235,942

[45] Nov. 25, 1980

[54] DIGESTIBLE POLYAMINO ACIDS

[75] Inventors: Michael J. Heller, Naperville, Ill.; John A. Ridgway, LaPorte, Ind.

[73] Assignee: Standard Oil Company (Indiana), Chicago, Ill.

[21] Appl. No.: 14,121

[22] Filed: Feb. 22, 1979

[51] Int. Cl.$^3$ .............................................. A23J 3/00
[52] U.S. Cl. ............................ 426/656; 260/112.5 R
[58] Field of Search ................... 426/656; 260/112.5, 260/112 R

[56] References Cited

U.S. PATENT DOCUMENTS

| | | | |
|---|---|---|---|
| 3,959,519 | 5/1976 | Johnson | 426/648 |
| 4,024,286 | 5/1977 | Cornelius | 426/656 X |
| 4,056,658 | 11/1977 | Bertram et al. | 426/2 |

OTHER PUBLICATIONS

Becker, R. R. et al., J. Biol. Chem. 204, pp. 737-743, (1953).

*Primary Examiner*—Robert A. Yoncoskie
*Attorney, Agent, or Firm*—Gregory E. Croft; William T. McClain; William H. Magidson

[57] ABSTRACT

Polyamino acids having a degree of polymerization of from 3 to about 60 have been found to be water-insoluble yet digestible in the presence of certain common proteolytic enzymes. Unlike the higher molecular weight polyamino acids, the polyamino acid products of this invention are useful for nutritional fortification of food materials.

14 Claims, No Drawings

DIGESTIBLE POLYAMINO ACIDS

BACKGROUND OF THE INVENTION

1. Field of the Invention

This invention relates to polymers of amino acids and methods for their preparation. More particularly, this invention pertains to water-insoluble and digestible polyamino acids, such as polymethionine, which are digestible by enzymes found in the human and animal digestive systems.

2. Description of the Prior Art

The amino acid fortification of foods will become very important in the future as larger amounts of vegetable proteins are used to replace or supplement less available and more costly protein from animal sources. Vegetable proteins, such as those contained in soy flour and wheat flour, are of lower nutritional quality than animal protein because they are limited in one or more of the essential amino acids, which include methionine, phenylanine, valine, leucine, isoleucine, lysine, threonine and tryptophan. These amino acids are absolutely required by humans and have to be obtained from dietary sources the same way as the vitamins. In addition, animal diets often benefit from amino acid fortification in order to produce healthier or larger animals. A comparison of the nutritional quality, measured in terms of a Protein Efficiency Ratio or PER value, for proteins from a variety of animal and vegetable sources is given in TABLE 1.

TABLE I

Comparison of Protein Nutritional Value

| Protein Source | Protein Efficiency Ratio (PER)* |
| --- | --- |
| Egg white | 3.8 |
| Fish | 3.0 |
| Milk (whole) | 2.8 |
| Beef (dried) | 2.8 |
| Casein | 2.5 |
| Soy flour | 1.9 |
| Yeast | 1.8 |
| Wheat flour | 1.2 |
| Collagen (Gelatin) | 0.1 |

*PER = $\frac{\text{Weight gain}}{\text{Protein consumed}}$

Eggs, fish, meat and milk proteins have higher PER values and are of better quality because they have a more complete complement of the essential amino acids. Proteins from the vegetable sources have much lower PER values because of limiting essential amino acid(s). The most serious problems occur with legumes (such as soybean), which are low in methionine, and with cereals, which are low in lysine. Yeasts and other single cell proteins have low PER values because they are also often limited in methionine.

One answer to the above problem is to directly fortify the vegetable proteins or yeast with the limiting amino acid(s). In certain cases this can be done, but unfortunately direct fortification with some amino acids, particularly methionine and lysine, causes significant problems. Some of the problems that occur are: toxicity of the free amino acid at higher concentrations; loss of nutritional value, due to reactivity of the free amino acid in the food system (Maillard reactions); loss of soluble amino acids, if cooking water is discarded; and taste and odor problems with the sulfur-containing amino acids (methionine).

Amino acid derivatives have been viewed as a possible way to supplement and avoid some of the problems associated with free amino acid addition. Methionine derivatives have been of particular interest because of their potential importance for supplementation of large amounts of soybean derived foods and feeds and because of more serious problems that occur with direct addition of the free amino acid.

For example, U.S. Ser. No. 3,952,115 (1976) to Damico et al. teaches the preparation of N-acyl-methionine esters and N-acyl derivatives of the sulfur amino acids for fortification of foodstuffs. U.S. Pat. No. 3,959,519 (1976) to Johnson teaches fortification of various foods with glycinemethionine dipeptides. U.S. Pat. No. 4,056,658 (1977) to Bertram et al. teaches the preparation and use of D,L-methionyl-D,L-methionine as a food and fodder additives. U.S. Pat. No. 4,024,286 (1977) to Cornelius et al. teaches the preparation of D,L-methionylglycine dipeptide and use as a food additive. None of these patents teach the synthesis of polymeric derivatives, however.

On the other hand, U.S. Pat. No. 2,650,214 (1953) to MacDonald teaches the preparation of synthetic alpha-monoaminomonocarboxylic acid polyamides, including the preparation of poly-D,L-methionine. These polymers were developed for their physical and structural characteristics, however, rather than for use as a nutritional food supplement, and therefore impliedly possess very high molecular weights.

More general information relating to the preparation of poly-alpha-amino acids can be found in *Advances in Protein Chemistry*, Vol. XIII, 1958, "Synthesis and Chemical Properties of Poly-Alpha-Amino Acids," pp. 244–475. The classical method for making these polymers is carried out by reacting the amino acid with phosgene in solvent such as benzene, dioxane, or ethyl acetate to produce the amino acid N-carboxy anhydride (NCA). The amino acid-NCA can be purified by recrystallization and is polymerized by dissolving it in an organic solvent such as dioxane with the addition of an initiator.

Aqueous polymerization of amino acid-NCAs is also reported for a number of amino acids, but no teachings are directed specifically to polymethionine, and nothing is suggested as to the significance of the degree of polymerization in regard to digestibility.

It is therefore an object of this invention to develop a form of polyamino acid, particularly a form of polymethionine, which is water-insoluble, completely digestible, non-toxic, non-reactive in food systems, and having less adverse taste or odor than the free amino acid.

This and other objects will become apparent from further reading of this specification.

SUMMARY OF THE INVENTION

In one aspect, this invention resides in a polyamino acid comprising moieties of at least one L-amino acid stereoisomer and having a degree of polymerization of from 3 to about 60, preferably from about 4 to about 12, and a method for making same. Suitable amino acids which may be used to form the homopolymers and heteropolymers of this invention include the L-stereoisomers of apolar amino acids such as methionine, tryptophan, isoleucine, leucine, threonine, valine, phenylalanine, and tyrosine. Poly-L-methionine is the preferred polymer because methionine is one of the most commonly deficient amino acids in many foods. The D-stereoisomer moieties or other moieties can be included within the polymer, but their presence may reduce the digestability of the polymer roughly in proportion to their relative amounts.

In a further aspect, the invention resides in a fortified food containing at least one added polyamino acid of the abovementioned types, such as poly-L-methionine, and having a degree of polymerization of from 3 to about 60, preferably from 4 to about 12.

DESCRIPTION OF THE PREFERRED EMBODIMENTS

The first requirement of any amino acid derivative used as a nutritional supplement is that it be susceptible to breakdown or hydrolyzed back to the free amino acid form by the proteolytic enzymes present in the digestive tract. The proteolytic enzymes or proteases are biological catalysts whose function is to break down proteins to amino acids. They accomplish this by catalyzing the hydrolysis of the peptide (amide) bonds within the protein.

We observed early in our work on polymethionine derivatives that all commercial polymers or polymers synthesized in the organic solvent phase by the classical approach previously discussed were totally resistant to digestion (hydrolysis) by proteolytic enzymes. That is, these polymers were not broken down to free methionine by the common digestive tract enzymes. A nondigestible polymer, of course, has no value as a nutritional supplement. We were ultimately successful, however, in developing an aqueous-ethanol solvent phase polymerization technique which produces a water-insoluble polymeric material which is completely digested by the proteolytic enzymes. The procedure for preparing such a polymer is described in the following Example 1.

EXAMPLE 1

Preparation Low Molecular Weight, Enzyme Digestible, Poly-L-Methionine

The aqueous-ethanol method of this invention for producing low-molecular weight, water-insoluble, enzyme digestible, poly-L-methionine produces a polymer having a degree of polymerization of from 3 to about 60, although the bulk of the material has a degree of polymerization in the range of 4 to about 12 (molecular weight of about 470–2000). The first step involves preparation and purification of the methionine-N-carboxy anhydride (Met-NCA) derivative. Approximately 100 g of L-methionine was dispersed into 400 ml of ethyl acetate and about 100 ml of phosgene was slowly added. The mixture was stirred and allowed to react for about two hours (the reaction was carried out in a closed vessel purged with nitrogen at about 25° C.). The resulting Met-NCA reaction mixture was then evacuated (using a water aspirator) to remove the unreacted phosgene and ethyl acetate. In order to recrystallize the Met-NCA, the Met-NCA reaction material was redissolved into 400 ml of ethyl ether. The solution was filtered (Watman #1 paper) to remove unreacted methionine, which is not soluble in ethyl ether. About 500 ml of n-pentane was slowly added to the ethyl ether Met-NCA solution to precipitate (or oil) out the Met-NCA from the solution. The yield of Met-NCA was about 30–40%.

The second and most important step involves the polymerization procedure. About 35 g of the Met-NCA was dissolved into 50 ml of ethyl alcohol. The ethanol/Met-NCA solution was added very slowly to 50–200 ml (preferably 100 ml) of water. During the addition of the ethanol/Met-NCA to the water, the pH was maintained at about 6.5 with 1-N aqueous sodium hydroxide. pH control is essential in preventing hydrolysis of the Met-NCA which will occur at a pH above 8 or below 5. The polymerization reaction was carried out at room temperature (25° C.) and proceeded vigorously with the generation of $CO_2$ and foam. Sufficient agitation must be maintained in order to achieve optimal polymerization. The poly-L-methionine formed a white precipitate in the reaction mixture. When $CO_2$ evolution ceased (about one hour) the polymerization reaction was complete. The poly-L-methionine precipitate was centrifuged (or filtered) and washed with water three times and lyophilized to dryness. The washing steps remove methionine and di- and tripeptide materials. Peptides and polymer of four or more amino acids in chain length are essentially water-insoluble. The yield of poly-L-methionine was approximately 50% (based on Met-NCA). The unreacted methionine and water-soluble peptides can be recycled into the process. The water-insoluble polymer produced by this procedure is enzyme digestible, non-toxic, non-reactive in food systems, and has less adverse taste or odor.

EXAMPLE 2

Preparation of Low Molecular Weight, Partially Digestible, Poly-D,L-Methionine

Preparation of the Met-NCA and its recrystallization were carried out as given in Example 1, except D,L-methionine was used instead of L-methionine. Polymerization was also carried out as given in Example 1.

The poly-D,L-methionine prepared by this procedure was also of low molecular weight, but was only partially enzyme digestible (approx. 50%) and found to be partially available as methionine in PER feeding studies. The reason for partial digestibility is due to presence of D-methionine rather than to polymer morphology. Only the L-stereoisomers of the amino acids contribute to the digestability of the polymers.

EXAMPLE 3

Preparation of High Molecular Weight, Non-Digestible Poly-L-Methionine

Preparation of the Met-NCA and its recrystallization were done as in Example 1. The polymerization procedure was basically the classical method (organic solvent) taught in the references mentioned previously. Specifically, about 35 g of Met-NCA was dissolved into 100 ml of dioxane. The solution was stirred and 0.5 ml of triethylamine was added to initiate the polymerization reaction. After several hours, water (approx. 100 ml) was added to precipitate out the polymer. The polymer was washed with water and centrifuged several times and dried by lyophilization. The poly-L-methionine produced by this procedure had a high molecular weight of approx. 30,000 (corresponding to a degree of polymerization of about 200) and was water-insoluble and non-digestible. Its properties were the same as those observed with commercial samples of poly-L-methionine. By comparison with the poly-L-methionine of Example 1, it is apparent that achieving a low degree of polymerization is critical in obtaining a digestible polymer.

EXAMPLES 4–15

Other Amino Acid Polymers

Other amino acid polymers can also be prepared according to the method described in Example 1. Such polymers include poly-L-tryptophan, poly-L-isoleucine, poly-L-leucine, poly-L-threonine, poly-L-valine, poly-L-phenylalanine, poly-L-tryosine, poly-L-methionine:valine (75–25), poly-L-methionine:tryptophan (75–25), poly-L-methionine:isoleucine (75–25), poly-L-methionine:threonine (75–25), and poly-L-tryptophan:threonine (50–50). These polymers can be prepared by substituting the appropriate amino acid-NCA(s) for Met-NCA in Example 1. The preparation of the amino acid-NCAs can also be carried out in the same manner, but other methods may be used as well.

Enzyme Digestion Studies

Results of enzyme digestion studies carried out on a variety of different polymethionine derivatives are given in TABLE 2. These studies were done at 37° C. in a buffered solution using chymotrypsin, carboxypeptidase and leucine aminopeptidase (digestive tract enzymes of humans and higher animals). After two hours, a small sample of the reaction mixture was removed and chromatographed on a thin-layer plate and the amount of free methionine was measured.

TABLE 2
Results From Enzyme Digestion Studies

| Polymer Derivative | % Methionine Released |
|---|---|
| Poly-L-Methionine (aqueous-ethanol polymerization method) | 90–100% |
| Poly-D,L-Methionine (aqueous-ethanol polymerization method) | 20–50% |
| Poly-D-Methionine (aqueous-ethanol polymerization method) | 0 |
| Poly-L-Methionine (organic solvent polymerization method) | 0 |
| Poly-L-Methionine (commercially available) | 0 |

The results show that poly-L-methionine prepared by the aqueous phase polymerization method was almost completely hydrolyzed to free methionine. Poly-D,L-methionine prepared by this procedure, but containing a racemic mixture of both the D and L stereoisomers of methionine, was only about 50 percent hydrolyzed. This result is consistent with the fact that the D-stereoisomer of amino acids is not the biologically active form, and is probably not susceptible to enzyme attack. The result for poly-D-methionine confirms this point in that this polymer was totally resistant to enzyme hydrolysis. The last two entries in TABLE 2 show no release of methionine from the polymer prepared in our laboratory by the organic solvent phase method or from a commercially available sample. In these cases, the reason for no release of methionine is the polymer morphology, which prevents the enzymes from effectively attacking and hydrolyzing the material. Both of these polymers have molecular weights over 30,000 and degrees of polymerization greater than about 200.

A further enzyme digestion study was made on the rate and susceptibility of poly-L-methionine (prepared by the aqueous solvent phase techniques) to hydrolysis by several of the digestive (proteolytic) enzymes. In these experiments poly-L-methionine was dispersed in a buffered solution containing a small amount of the enzyme or enzyme mixture, and the decrease in optical density (due to hydrolysis of the polymer to free methionine) was measured using a Klett Colorimeter. The results showed that the poly-L-methionine was most readily hydrolyzed by carboxypeptidase A (an exopeptidase), which attacks polypeptide chains from the carboxy terminal end. The other digestive enzymes, chymotrypsin (an endopeptidase), and leucine aminopeptidase (an exopeptidase), were less effective. A mixutre of all three was moderately effective. These results indicated that the poly-L-methionine prepared by the aqueous-ethanol phase polymerization was very protein-like in nature.

Physical and Chemical Characterization of Poly-L-Methionine

The results from the enzyme digestion studies showed that there is a radical difference between the poly-L-methionine produced by the aqueous-ethanol solvent phase polymerization and the material prepared in the organic solvent phase, which includes commercial samples. These results were initially confirmed by scanning elecron photomicrographs comparing the aqueous phase poly-L-methionine with a commercial sample, which showed major differences in polymer morphology. The aqueous phase polymer material was found to be very porous and amorphous in nature. On the other hand, the commercial sample (prepared by organic solvent phase polymerization) was crystalline in nature, and as stated before, was totally resistant to enzyme hydrolysis.

A more precise characterization was made by liquid chromatography using porous-glass beads (80–120 mesh, 126 Å mean pore diameter) and chloroform-trifluroacetic acid (95:5) as the solvent. High molecular weight (110,000) polystyrene was used to determine the excluded volume of the column and Indigotin (MW 262) was used for the included volume. The glass beads were rated for molecular weight separations between 1000 and 30,000. The results indicate that most of the material was in the low molecular weight range (approx. 1000), but some of the polymer may have had molecular weights as high as 10,000, corresponding to a degree of polymerization of about 60. From previous thin layer chromatography results we know that all methionine, dipeptide, and most tripeptide had been removed from our material. Therefore, the lowest molecular weight material could be methionine tripeptide (MW 470), with the bulk of the material in the 600–2000 molecular weight region or 4–12 amino acids in chain length (degree of polymerization). Although this polymer is water-insoluble, the surface must be porous and wettable enough that enzyme molecules can effectively diffuse into it and attack the structure. On the other hand, the crystalline structure of high molecular weight poly-L-methionine (greater than 10,000) must prevent diffusion of enzyme molecules into the structure.

The degree of polymerization of the polymethionine is critical in achieving a polymer which is useful for fortification of foods. A degree of polymerization of from 3 to about 60, and preferably from about 4 to about 12, is required. Because the aqueous-ethanol polymerization technique naturally tends to produce a lower degree of polymerization, it is the preferred method of producing the polymethionine of this invention. Under proper controls, the organic solvent method can also be used, as those skilled in polymerization techniques will appreciate, but the toxicity of most solvents and initiators can cause difficulties in preparing a product acceptable for consumption.

Polymethionine for Nutrition Supplementation (PER Feeding Studies)

PER feeding studies were carried out in order to determine the true degree of digestibility and nutritional availability of the low molecular weight polymethionine of this invention in an animal diet. As stated earlier, PER values are a measure of the nutritional quality of a given protein. In these studies soy flour and yeast, both deficient in methionine, were supplemented at 1.8–2.0 percent (by protein weight) with polymethionine derivatives. The controls were soy flour and yeast alone, as well as soy flour and yeast each supplemented with 2.0 percent free methionine. Casein, which has a PER value of 2.5, was the standard protein for the whole test. The results for this study are given in TABLE 3. Also given in TABLE 3 are the weight gains and amount of protein consumed for each group of animals (rats).

TABLE 3

Results from PER Feeding Studies (1.8–2.0% Methionine Supplementation)

| Sample | Corrected PER | Avg. wt. gain (g) after 4 wks. | Avg. protein consumed (g) after 4 wks. |
|---|---|---|---|
| Casein Standard | 2.50 | 116.9 | 35.19 |
| Soy flour | 1.86 | 85.1 | 34.40 |
| Soy flour/L-methionine | 2.59 | 136.3 | 39.58 |
| Soy flour/Poly-L-methionine | 2.53 | 133.7 | 39.74 |
| Soy flour/D,L-methionine | 2.58 | 133.8 | 39.12 |
| Soy flour/Poly-D,L-methionine | 2.26 | 118.4 | 39.29 |
| Yeast | 1.48 | 52.5 | 26.63 |
| Yeast/L-methionine | 2.56 | 122.5 | 35.97 |
| Yeast/Poly-L-methionine | 2.74 | 131.7 | 35.87 |
| Yeast/Poly-L-methionine high molecular weight produced by organic solvent method) | 1.61 | 59.6 | 28.76 |

The results show that in the case of soy flour, poly-L-methionine appears to be just as effective for increasing PER value as free methionine addition. Poly-D,L-Methionine is found to be about 60 percent as effective as direct D,L-methionine supplementation. This result is in agreement with our enzyme studies, which showed poly-D,L-methionine to be much less susceptible to enzyme hydrolysis. In the case of the yeast diets, it appears that poly-L-methionine may be slightly more effective than free L-methionine for increasing the PER value. In both the yeast and soy diets poly-L-methionine increased the PER value above 2.5, the casein value. The yeast diet studies are quite impressive, with poly-L-methionine giving over an 80 percent increase in PER, from 1.50 to 2.74. In a similar feeding study, a yeast-poly-L-methionine sample produced by the organic solvent method (high molecular weight) showed a PER increase of only about 14 percent, from 1.41 to 1.61.

The digestible polymers of this invention are valuable food additives for both human and animal consumption. In the beef industry, for example, where methionine fortification of ruminant feeds is unsuccessful due to predigestion of the free methionine by microorganisms in the rumen, the polymethionine of this invention can be incorporated into the feed and will pass through the rumen to the stomach where the methionine is then freed and digested by the animal.

In view of these teachings it will be apparent to those skilled in the art that many deviations from these examples, shown only for purposes of illustration, can be made without departing from the scope of this invention as defined by the following claims.

We claim:

1. A polyamino acid comprising moieties of at least one amino acid selected from the group consisting of L-methionine and D,L-methionine and having a degree of polymerization of from 3 to about 60, said polyamino acid being characterized by high insolubility in water and enzyme digestibility.

2. The polyamino acid of claim 1 primarily having a degree of polymerization of from 4 to about 12.

3. The polyamino acid of claim 2 wherein the polyamino acid is a homopolymer.

4. The polyamino acid of claim 3 wherein the amino acid is L-methionine.

5. The polyamino acid of claim 3 wherein the amino acid is D,L-methionine.

6. A method for preparing a digestible poly-L-methionine from L-methionine-N-carboxy anhydride comprising:

(a) preparing a solution of the L-methionine-N-carboxy anhydride in ethanol; and (b) combining the L-methionine-N-carboxy anhydride/ethanol solution with water while maintaining the pH at 5–8 with aqueous hydroxide ion to effect polymerization for a period of time so as not to exceed a degree of polymerization of about 60.

7. The method of claim 6 wherein the polyamino acid is separated, washed with water, and dried.

8. The method of claim 7 wherein the degree of polymerization is primarily from 4 to about 12.

9. A fortified vegetable protein-containing food having an added polyamino acid, said polyamino acid containing at least one L-amino acid stereoisomer moiety selected from the group consisting of methionine, tryptophan, isoleucine, leucine, threonine, valine, phenylalanine, and tyrosine and having a degree of polymerization of from 3 to about 60.

10. The fortified food of claim 9 wherein the polyamino acid primarily has a degree of polymerization of from about 4 to about 12.

11. The fortified food of claim 10 wherein the polyamino acid contains L-methionine moieties.

12. The fortified food of claim 11 wherein the polyamino acid is a homopolymer.

13. The fortified food of claim 9 wherein said food contains soy protein.

14. The fortified food of claim 9 wherein said food contains wheat protein.

* * * * *